United States Patent [19]

Akashi

[11] Patent Number: 4,801,962

[45] Date of Patent: Jan. 31, 1989

[54] CAMERA INCORPORATING AUTOMATIC FOCUSING APPARATUS

[75] Inventor: Akira Akashi, Yokohama, Japan

[73] Assignee: Canon Kabushiki Kaisha, Tokyo, Japan

[21] Appl. No.: 140,301

[22] Filed: Dec. 31, 1987

[30] Foreign Application Priority Data

Jan. 12, 1987 [JP] Japan .................................. 62-4562
Jan. 12, 1987 [JP] Japan .................................. 62-4563
Jan. 12, 1987 [JP] Japan .................................. 62-4564

[51] Int. Cl.⁴ .............................................. G03B 3/00
[52] U.S. Cl. .................................... 354/402; 354/415; 354/403; 354/419
[58] Field of Search ............... 354/400, 402, 403, 410, 354/419, 415

[56] References Cited

U.S. PATENT DOCUMENTS

| | | | |
|---|---|---|---|
| 3,813,679 | 5/1974 | Hasegawa et al. .................. | 95/44 R |
| 4,410,261 | 10/1983 | Masunaga et al. ....................... | 356/1 |
| 4,459,006 | 7/1984 | Sakai et al. ........................... | 354/406 |
| 4,474,447 | 10/1984 | Kawabata et al. .................. | 354/406 |
| 4,521,093 | 6/1985 | Kawabata et al. .................. | 354/403 |
| 4,527,880 | 7/1985 | Okino .................................. | 354/403 |
| 4,536,072 | 8/1985 | Taniguchi et al. .................. | 354/403 |
| 4,609,274 | 9/1986 | Iwashita et al. ..................... | 354/445 |
| 4,688,914 | 8/1987 | Sakai et al. ...................... | 354/173.11 |
| 4,693,581 | 9/1987 | Yamaki et al. ....................... | 354/410 |
| 4,693,582 | 9/1987 | Kawamura et al. ................. | 354/403 |

*Primary Examiner*—Russell E. Adams
*Attorney, Agent, or Firm*—Fitzpatrick, Cella, Harper & Scinto

[57] ABSTRACT

Disclosed is an automatic focusing apparatus for a camera and, more particularly, to an automatic focusing apparatus for a camera of a type which performs a focus detecting operation under emission of auxiliary light when, e.g., luminance is low. In the camera of this type, if a mode of the automatic focusing apparatus is set to a servo mode, the servo mode can be switched to a one-shot mode when the focus detecting operation is to be performed under emission of the auxiliary light. Since the auxiliary light is not continuously emitted, an auxiliary light source is protected.

11 Claims, 5 Drawing Sheets

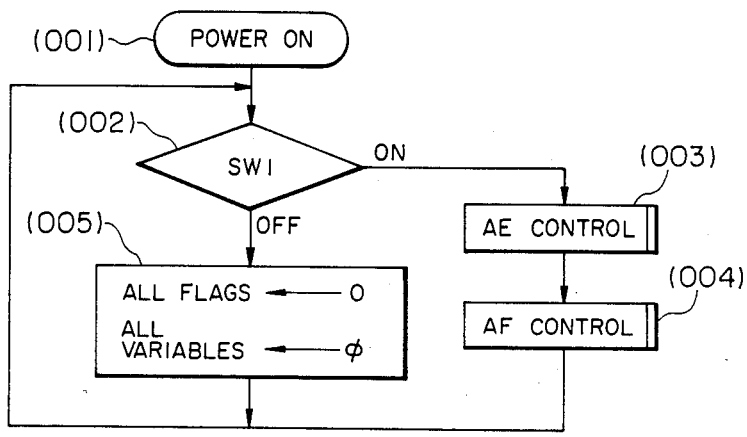
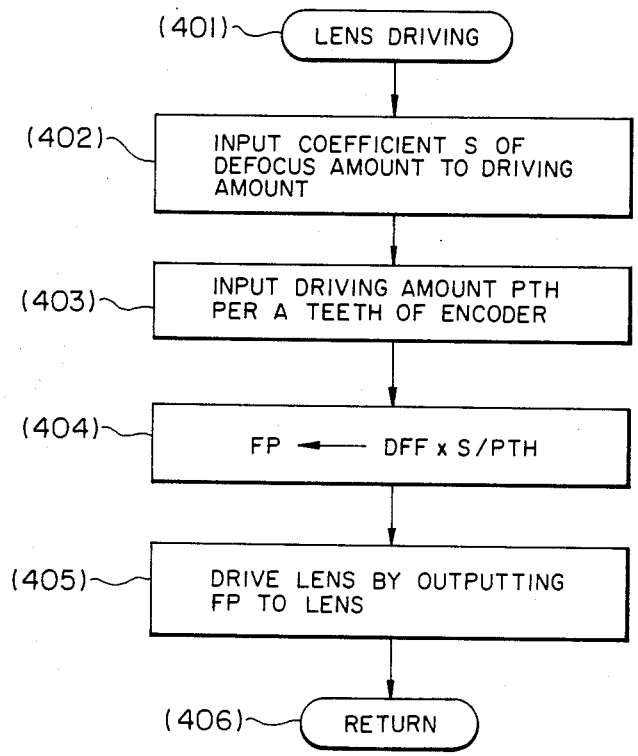

CAMERA INCORPORATING AUTOMATIC FOCUSING APPARATUS

BACKGROUND OF THE INVENTION

Field of the Invention

The present invention relates to an automatic focusing apparatus for, e.g., a camera and, more particularly, to an automatic focusing apparatus using auxiliary light.

Related Background Art

One of conventional methods for a focusing apparatus of a camera is such that a light beam from an object to be photographed, which is transmitted through a photographing lens, is received and stored by a charge-storage photoelectric conversion element such as a CCD. In this case, if luminance of the light beam is determined to be low, auxiliary light is radiated on the object to be photographed, and charge is stored again. Then, a focusing state of the photographing lens is detected in accordance with an output, and the photographing lens is driven on the basis of a detection result. In many cases, in order to protect an auxiliary light source and to save energy, the number of radiations of the auxiliary light is limited to a finite one.

In addition, various operation modes of a camera focusing apparatus are known such as a so-called "one-shot mode" in which once an in-focus state is obtained, focusing is not performed until an external member is operated, and a so-called "servo mode" in which focusing is continuously performed regardless of a previous focusing state.

However, when the above servo mode is selected by a user and at the same time auxiliary light is used because luminance of an object to be photographed is reduced, time corresponding to the number of radiations described above passes while focusing is continuously performed by radiating the auxiliary light in accordance with control in the servo mode. As a result, the auxiliary light is no longer radiated, thereby significantly degrading operability.

In addition, the auxiliary light source is turned on when luminance is determined to be low as described above. When the auxiliary light source is turned on, luminance is increased thereby. However, the auxiliary light source may be undesirably turned off although a focusing state need be detected under emission of the auxiliary light.

Furthermore, when so-called continuous photographing is to be performed by a camera incorporating the above automatic focusing apparatus, automatic focusing and photographing are repeatedly performed. In this case, since the auxiliary light for focusing is emitted for a short time interval every time focusing is performed, time corresponding to the above finite number of emissions may pass soon.

SUMMARY OF THE INVENTION

According to one aspect of the application, in an automatic focusing operation performed under emission of auxiliary light, even if a servo mode is set in advance, the servo mode can be switched to a one-shot mode, thereby eliminating the above drawbacks.

According to another aspect of the application, when the automatic focusing operation is performed under emission of auxiliary light in low luminance detection, a luminance detecting operation is inhibited until the automatic focusing operation is finished, so that the auxiliary light is not turned off although the auxiliary light is required in this low luminance detection because luminance is increased due to emission of the auxiliary light during the automatic focusing operation.

Still another aspect of the application is to provide a camera which inhibits the automatic focusing operation in an auxiliary light mode during continuous photographing, thereby preventing the auxiliary light source from emitting light by a finite number of emissions because the automatic focusing operation in the auxiliary light mode is repeatedly performed for each photographing during continuous photographing.

Still another aspect of the application is to provide a camera which inhibits emission of the auxiliary light after an auxiliary light emission count reaches a predetermined number in a repetitive focus detecting operation performed under emission of the auxiliary light, and which performs the focus detecting operation without emission of the auxiliary light thereafter, thereby performing the focus detecting operation even if time corresponding to the finite number of emissions of the auxiliary light passes in the auxiliary light mode.

Other objects of the present invention will become apparent from an embodiment to be described below with reference to the accompanying drawings.

BRIEF DESCRIPTION OF THE DRAWINGS

FIGS. 2, 3, and 4A to 4C are flow charts of a program for explaining operations of the embodiment shown in FIG. 1.

DESCRIPTION OF THE EMBODIMENT OF THE INVENTION

Figure 1:
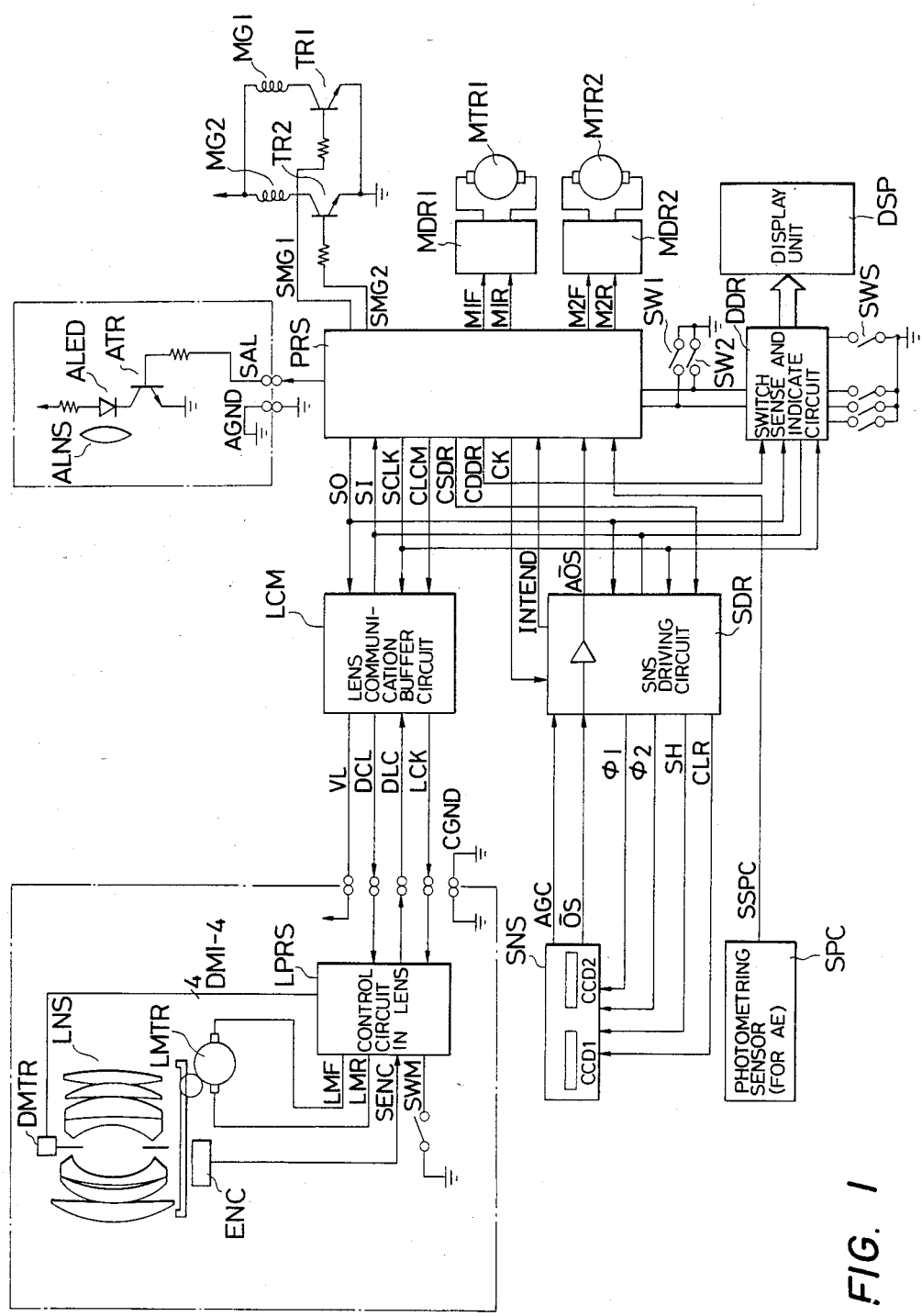
FIG. 1 is a circuit diagram of an embodiment in which a focus detection apparatus according to the present invention is applied.

FIG. 1 shows a circuit diagram showing an embodiment of a camera incorporating an automatic focusing apparatus according to he present invention. In FIG. 1, a camera control unit is a one-chip microcomputer PRS having therein a ROM, a RAM, and an A/D-converting function, and in accordance with a program (to be described later) stored in the ROM, performs camera operations such as an automatic exposure control function, an automatic focus detecting function, and film winding/rewinding.

The microcomputer PRS communicates with a peripheral circuit and a lens using communication signals SO, SI, and SCLK and controls operations of the circuit and the lens.

The communication signal SO is a data signal output from the microcomputer PRS, the communication signal SI is a data signal input to the microcomputer PRS, and the communication signal SCLK is a sync signal of the signals SO and SI.

A lens communication buffer circuit LCM supplies a lens power source voltage VL to the lens when the camera is operated, and when a signal CLCM from the microcomputer PRS is at a high potential level (to be referred to as "H" hereinafter, and a low potential is to be referred to as "L" hereinafter), serves as a buffer for communication between the camera and the lens. When the microcomputer PRS sets the signal CLCM at "H" and sends predetermined data as the signal SO in synchronism with the signal SCLK, the circuit LCM is designated and outputs buffer signals LCK and CDL respectively of the signals SCLK and SO to the lens through contacts between the camera and the lens. At the same time, the circuit LCM outputs a buffer signal of the signal DLC from the lens (which is a portion indicated by an alternate long and dashed line in FIG. 1). The microcomputer PRS inputs lens data as the signal SI in synchronism with the signal SCLK.

An SNS driving circuit SDR for driving a line sensor unit SNS for focus detecting is selected when a signal CSDR from the microcomputer PRS is at "H" and is controlled by the microcomputer PRS in accordance with the signals SO, SI, and SCLK.

The sensor unit SNS includes, e.g., a pair of CCD line sensors CCD1 and CCD2. When the SNS driving circuit SDR receives a clock CK from the microcomputer PRS, it generates CCD driving clocks $\phi 1$ and $\phi 2$. The SNS driving circuit SDR, which is controlled by the microcomputer PRS, also generates a signal SH for transferring a charge stored in the line sensors CCD1 and CCD2 to a transfer section and a clear signal CLR for clearing the charge stored in the line sensors CCD1 and CCD2.

An output signal OS from the sensor unit SNS is an image signal which is time-serially output in synchronism with the clocks $\phi 1$ and $\phi 2$ and stored in the sensors CCD1 and CCD2. The signal OS is output in units of bits of the sensors CCD1 and CCD2, amplified by an amplifier in the circuit SDR, and then input as a signal AOS to the microcomputer PRS. The microcomputer PRS inputs the signal AOS from its analog input terminal, A/D-converts it by an internal A/D-converting function in synchronism with the CK signal, and then sequentially stores it in a predetermined address.

A signal AGC, which is also an output signal from the sensor unit SNS, is an output from a storage controlling sensor in the unit SNS. The signal AGC is input to the circuit SDR and is used to control a storage time of the sensors CCD1 and CCD2.

A photometric sensor SPC receives light through a photographing lens. An output SSPC from the photometric sensor SPC is input to the analog input terminal of the microcomputer PRS and is used for automatic exposure (AE) control after A/D conversion.

A switch sense and indicate circuit DDR is selected when a signal CDDR from the microcomputer PRS is at "H" and communicates with the microcomputer PRS in accordance with the signals SO, SI, and SCLK. That is, the switch sense and indicate circuit DDR switches displays of the camera on the basis of data supplied from the microcomputer PRS and informs the microcomputer PRS of switching states of switches SWS which are turned on/off in association with operating members, e.g., switching states of switches SW1 and SW2 interlocked with a release button.

Driving circuits MDR1 and MDR2 for film feed and shutter charge motors MTR1 and MTR2 drive the motors in the forward/reverse direction in accordance with signals M1F, M1R, M2F, and M2R.

A shutter front curtain running start magnet MG1 and a shutter rear curtain running start magnet MG2 are energized by amplifying transistors TR1 and TR2, and shutter control thereof is performed by the microcomputer PRS.

An auxiliary light source ALED emits light on an object to be photographed when luminance is low. By setting a signal from an output terminal SAL of the microcomputer PRS at "H", the auxiliary light source ALED drives a driving transistor ATR and emits auxiliary light through an optical system ALNS. The auxiliary light source ALED is constituted by, e.g., a light-emitting diode.

Note that since the switch sense and indicate circuit DDR, the motor driving circuits MDR1 and MDR2, and the shutter control are not essentially associated with the present invention, and a detailed description thereof will be omitted. A signal DCL, which is input to a control circuit LPRS in the lens in synchronism with the sync signal LCK, is instruction data from the camera to the lens. Operations of the lens with respect to instructions are predetermined.

The control circuit LPRS analyzes an input instruction in accordance with a predetermined procedure and performs focusing or aperture control or outputs various lens parameters (e.g., a full-aperture f-number, a focal length, and a coefficient of a defocus amount to a driving amount) from its output DLC.

In this embodiment, an integral extension type single lens is used. When a focusing instruction is supplied from the camera, the control circuit LPRS sends signals LMF and LMR to a focusing motor LMTR to drive it in accordance with driving amount/direction data which is supplied simultaneously with the instruction and moves an optical system in an optical axis direction to perform focusing. A moving amount of the optical system is monitored by a signal SENC of an encoder circuit ENC. When predetermined movement of the system is finished, the signals LMF and LMR are set at "L" to deenergize the motor LMTR. The encoder circuit ENC is constituted by, e.g., a pulse plate, interlocked with the optical system, for outputting pulses by the number corresponding to a moving amount of the optical system.

When an aperture control instruction is supplied from the camera, the control circuit LPRS drives, in accordance with stop-down data which is supplied simultaneously with the instruction, a known stepping motor DMTR which is interlocked with an aperture mechanism.

Operations of the embodiment shown in FIG. 1 will be described below with reference to FIGS. 2 to 4(c).

First, when a power source switch (not shown) is operated, the microcomputer PRS is powered and executes a program stored therein.

FIG. 2 is a flow chart showing an overall flow of the above program. When execution of the stored program is started, a switching state of the switch SW1 which is turned on with a first stroke operation of a shutter button (not shown) is detected in step (002). If the switch SW1 is turned off, "0"s are set in all flags in the microcomputer PRS and "0"s are also set in all variables therein to be described later, in step (005). Note that an ON/OFF state of the switch SW1 is detected by setting the signal CDDR at "H" by the microcomputer PRS to communicate with the circuit DDR.

The steps (002) and (005) are repeatedly executed until the switch SW1 is turned on, and when the switch SW1 is turned on, the flow advances to step (003).

The step (003) is a subroutine for AE control. By this AE control, a series of control operations such as photometric calculation processing, exposure control, and shutter charging, film winding, and the like after exposure are performed. Note that since the AE subroutine is not essentially associated with the present invention, a detailed description thereof will be omitted. The AE subroutine will be briefly described below. That is, as long as the switch SW1 is kept on, photometry and an exposure control calculation are performed every time the AE subroutine is executed When a second stroke operation of the shutter release button is performed and the switch SW2 is turned on, a release operation is performed by interruption processing, and in accordance with an exposure amount obtained by the exposure control calculation, an f-number or a shutter speed is controlled. After exposure is finished, shutter charging and film feeding operations are performed. Note that at this time, lens driving is inhibited even if the lens is being driven.

Assume that the first stroke operation of the shutter release button is performed. In this case, photometry and calculation processing are performed in step (003), and then the flow advances to step (004). If the AF operation mode is set to the so-called "servo mode" and "manual mode", the above interruption operation is allowed when first photometric operation from ON of the power source switch is finished. If the AF operation mode is set to the "one-shot mode", the interruption operation is allowed when an in-focus state is detected. That is, in the "servo mode" or "manual mode", the release operation can be performed any time regardless of the focusing operation, and in the "one-shot mode", it cannot be performed unless the in-focus state is detected. Note that the AF mode is selected by a mode switch (not shown) In the "one-shot mode", once the in-focus state is obtained, the AF operation is not performed until the switch SW1 is turned off, and in the "servo mode", the AF operation is always performed.

In step (004) of the AF control, a focusing state of the photographing lens is detected If the "one-shot mode" or "servo mode" is selected, the photographing lens is so driven as to obtain the in-focus state. If the "manual mode" is set, only a display indicating the in-focus or out-of-focus state is performed. In the "manual mode", no AF control using the auxiliary light is performed.

In the above flow, the AE control in step (003) and the AF control in step (004) are repeatedly performed as long as the switch SW1 is kept on.

Figure 3:
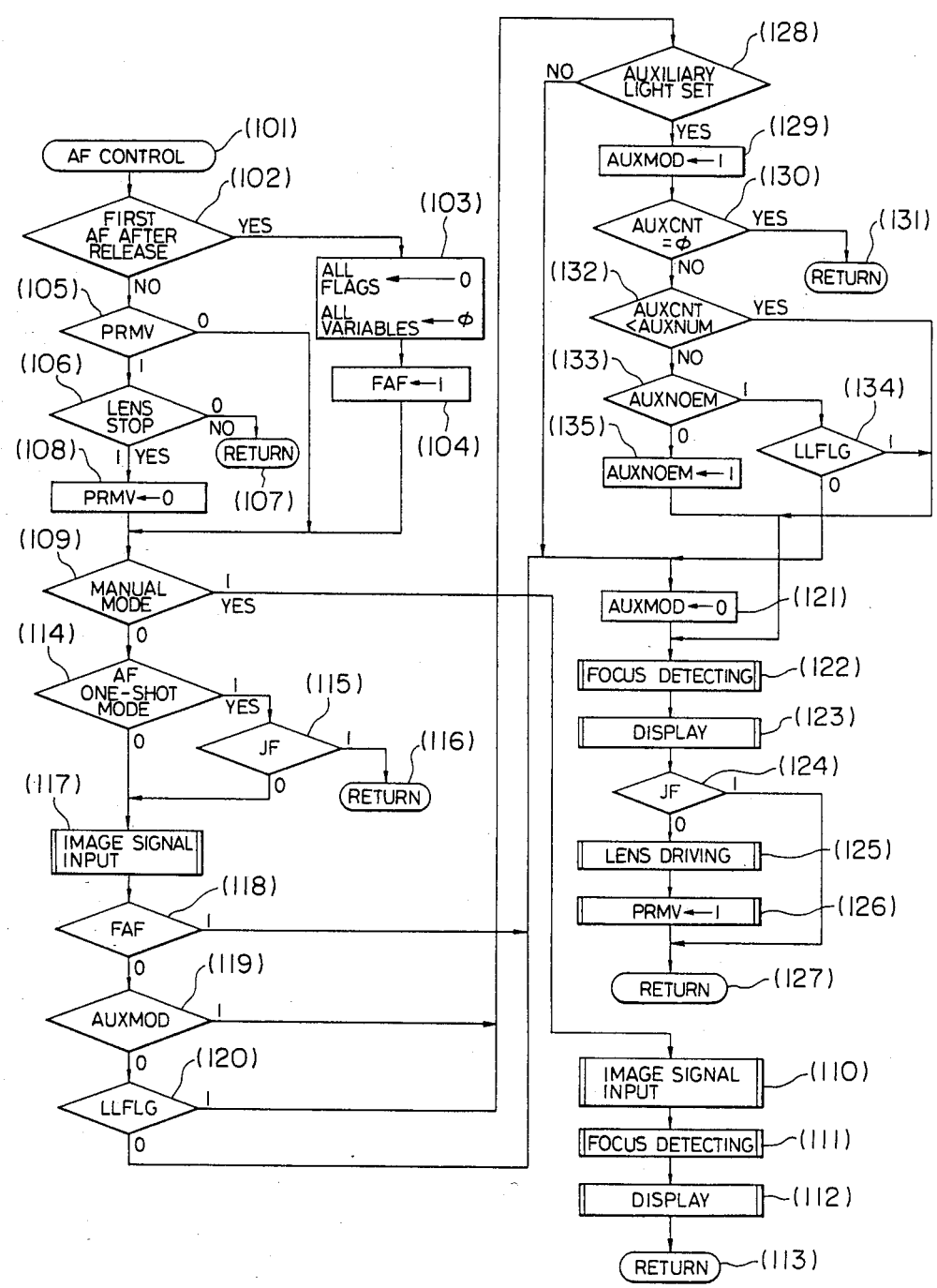

The step (004) is an AF control subroutine in which an AF control subroutine shown in FIG. 3 is executed.

Step (102): the microcomputer SPR determines in accordance with the shutter release operation whether this is the first AF control operation immediately after photographing of one frame is finished (whether film feeding is performed in the immediately preceding AE control subroutine) and determines whether this is a "continuous photographing mode". If the microcomputer determines in step (102) that this is an AF control subroutine immediately after a photographing operation is performed in the immediately preceding AE control subroutine, it assumes that this is AF in the continuous photographing mode. Therefore, in step (103), "0"s are set in all the flags and in all the variables in the microcomputer PRS. As a result, in the "continuous photographing mode", a previous AF control state is initialized. In step (104), "1" is set in a continuous photographing mode flag FAF to store information representing the AF control during continuous photographing, and then the flow advances to step (109). Note that in the above "continuous photographing mode", the flow advances to the AE subroutine after the AF subroutine, and the release operation is performed in the AE subroutine. If the microcomputer SPR determines in step (102) that an exposure operation is not performed in the AE control subroutine which is performed immediately before, the flow advances to step (105). In step (105), a set state of a flag PRMV is detected. The flag PRMV is a "lens driving flag". If lens driving is not performed in previous AF control, "0" is set in the flag PRMV, and then the flow advances to step (109) to perform AF control. On the contrary, if lens driving is performed in previous AF control, the microcomputer PRS determines in step (106) whether lens driving is stopped.

In step (106), the microcomputer PRS communicates with the lens LNS through the lens communication buffer circuit LCM and the control circuit in the lens LPRS and checks a state of the lens by receiving a monitor signal, as described above with reference to FIG. 1. If the lens is not stopped, i.e., the lens is being driven, the AF control subroutine is finished. Therefore, as long as the lens is kept in a driving state, the microcomputer SPR repeatedly determines in step (106) whether the lens is stopped. According to the present invention, AF control is not performed when the lens is driven but performed only when the lens is stopped. Therefore, when the lens is stopped, "0" is set in the flag PRMV for the first time in step (008), and then the flow advances to step (109). As described above, the encoder circuit ENC outputs pulses when the lens is moved and has a counter for counting the pulses. An arrangement is such that, as will be described later, when the number of pulses corresponding to a detected defocus amount is input to the counter from the microcomputer PRS and a pulse count from the encoder circuit ENC becomes the number of pulses corresponding to the defocus amount, the signals LMF and LMR are set at "L" to stop the motor LMTR and hence the lens, and at the same time, a lens stop signal is generated. Therefore, in step (106), the presence/absence of lens stop is detected by the above communication, thereby determining whether the lens is stopped.

Step (109): an automatic focusing mode is determined. If the manual mode is selected, the flow advances to step (110) ("manual" is selected by the mode switch (not shown)). A subroutine of an image signal input is performed in step (110), and a subroutine of displaying focus detecting is performed in steps (111) and (112). Thereafter, the AF control subroutine is finished in step (113) (each subrouthed will be described later).

By an operation from step (101) to step (113), the AF control subroutine in the manual mode is executed. That is, since lens driving is not performed in the manual mode, "0" is set in the flag PRMV. If continuous photographing is not performed, steps (101), (102), (105), and (109) to (113) are repeatedly performed every time the AF control subroutine is called as long as the switch SW1 is kept on. In this case, every time the AF control subroutine is performed, the in-focus or out-of-focus state is repeatedly displayed on the display unit DSP in accordance with a focusing state which is determined in a focus detecting subroutine. During continuous photographing, the in-focus or out-of-focus state is displayed every time photographing is performed, and the photographing operation is repeatedly performed in the AE control subroutine after display That is, during continuous photographing, the focusing state is repeatedly performed in the AE control subroutine as long as the switch SW2 is kept on.

If the microcomputer PRS determines in step (109) that the manual mode is not set, it determines in step (114) whether the "one-shot mode"0 is set. If Y (YES) in step (114), the flow advances to step (115). In step (115), the microcomputer PRS determines in accordance with a state of an in-focus flag JF whether an "in-focus state" is previously obtained. If the AF control mode is the "one-shot mode"0 and the "in-focus state" is previously obtained, AF control is finished in step (116). That is, in the one-shot mode, once the in-focus state is obtained, AF control is not executed again unless the switch SW1 is turned off. If N (NO) in step (115), the flow advances to step (117).

Step (117): an image signal input subroutine is executed. In the image signal input subroutine, the microcomputer PRS sets the signal CSDR at "H" to select the driving circuit SDR and transmits the signal SO thereto. At this time, the signal SO is a storage start instruction, and in accordance with this instruction, the driving circuit SDR transmits the signal CLR to the line sensor unit SNS to clear an image storage signal of the CCD line sensors so that the CCD line sensors start image storage. Image light beams incident through the photographing lens are incident on the CCD line sensors CCD1 and CCD2 of the line sensor unit SNS which performs a storage operation with respect to an image. Image positions on the sensors CCD1 and CCD2 are determined in accordance with a focusing state. That is, in an in-focus state with respect to an object to be photographed, the same pattern is projected on the same position on each of the sensors CCD1 and CCD2. In a near-focus or far-focus state, image patterns are projected on positions of the sensors CCD1 and CCD2 symmetrically offset from each other in correspondence to a focus offset direction and a focus offset amount of the state. Therefore, by detecting the offset amount and direction of the positions between the image patterns on the sensors CCD1 and CCD2, the focus offset direction and amount can be detected.

The image patterns projected on the positions corresponding to the focusing state as described above are stored by the sensors CCD1 and CCD2 after the image signal is cleared. After the images are stored for a predetermined time interval, the driving circuit SDR supplies the signal SH and the clocks $\phi 1$ and $\phi 2$ to the sensor unit SNS. Note that the storage time of the image patterns is determined on the basis of the output AGC from the storage control sensor in the sensor unit SNS.

When the signal SH and the clocks $\phi 1$ and $\phi 2$ are supplied to the sensor unit SNS as described above, an image signal stored in each bit of each of the sensors CCD1 and CCD2 is sequentially and time-serially output from the output terminal of the sensor unit SNS and is sequentially input as the signal AOS, which is amplified by the amplifying circuit in the driving circuit SDR, to the analog input terminal of the microcomputer PRS. The microcomputer PRS A/D-coverts the signal AOS by the internal A/D-converting function in synchronism with the clock CK which is output by the microcomputer PRS to obtain a digital image signal and sequentially stores the signal at a predetermined address in the RAM.

Figure 4A:
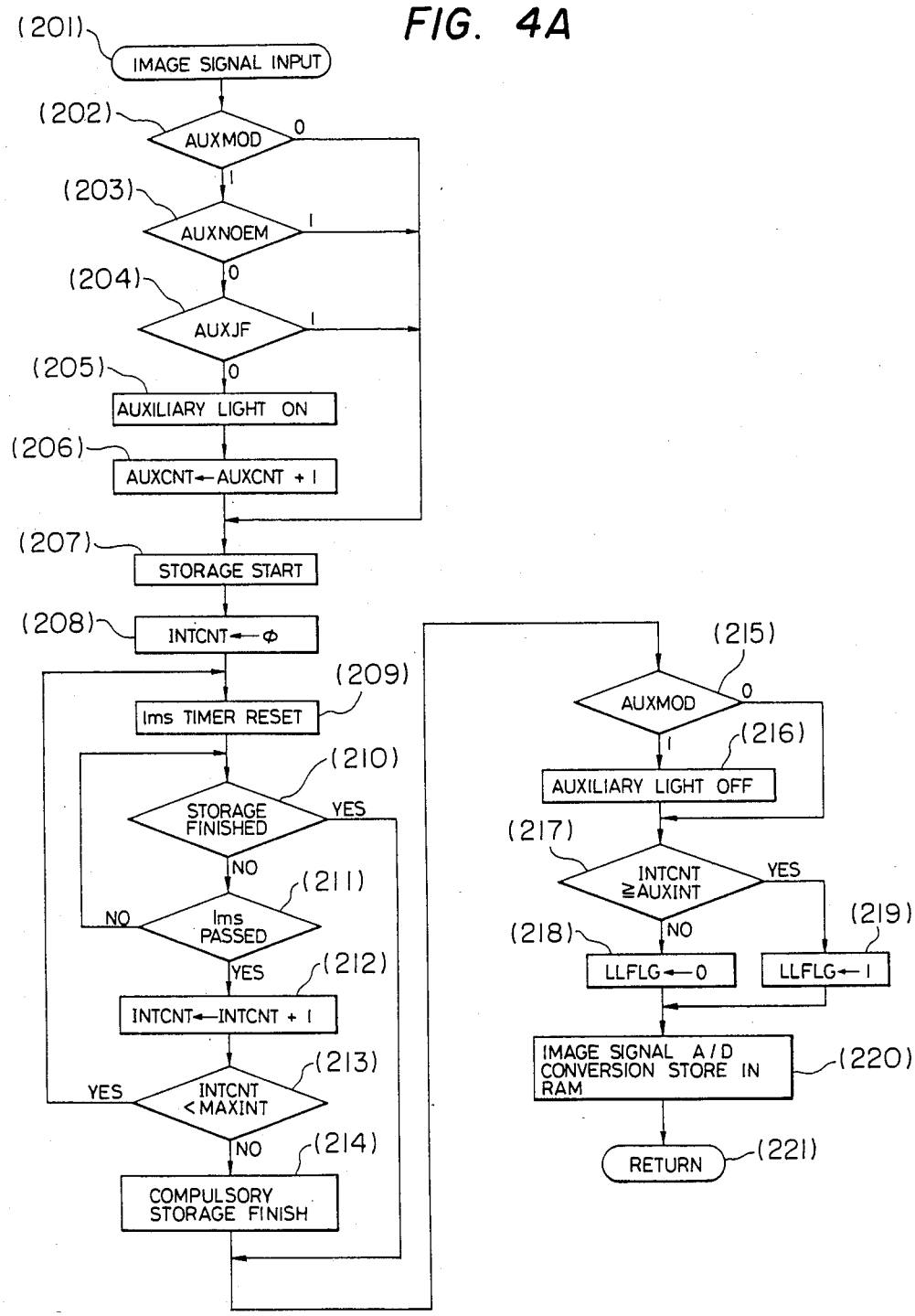

By the above operation, the image signal of each of the sensors CCD1 and CCD2 corresponding to the image pattern thereon is stored in the RAM as a digital value, and on the basis of the digital value, an offset amount from the focused position, i.e., a defocus amount is detected by a focus detecting subroutine to be described later. Steps of the image signal input subroutine are shown in FIG. 4(a) in detail. In FIG. 4(a), an image signal input in step (201) is called from the AF control routine. Then, in step (202), the microcomputer PRS determines in accordance with a flag AUXMOD ("1" is set in this flag when an auxiliary light mode is set) whether previous AF control is the "auxiliary light mode". If N in step (202), the flow advances to step (207). Otherwise, the flow advances to step (203).

Step (203): the microcomputer PRS determines in accordance with a flag AUXNOEM ("1" is set in this flag when the auxiliary light is emitted by the predetermined number of times) whether emission of the auxiliary light by the predetermined number of times is finished. If Y in step (203), the flow advances to step (207). Otherwise, the flow advances to step (204).

Step (204): the microcomputer PRS determines in accordance with a flag AUXJF ("1" is set in this flag when an in-focus state is obtained in the auxiliary light mode) whether the in-focus state is previously obtained under emission of the auxiliary light. If Y in step (204), the flow advances to step (207) without emitting the auxiliary light. Otherwise, the flow advances to step (205) of auxiliary light ON.

Although the flag AUXJF will be described in detail in a subroutine "focus detecting", this flag serves to determine whether the in-focus state is obtained under emission of the auxiliary light. When "1" is set in the flag AUXJF, no auxiliary light is emitted even if the flag AUXMOD indicates the auxiliary light mode and the flag AUXNOEM indicates that the light emission count is below the predetermined number.

Step (205): the auxiliary light is turned on.

By setting "1" in the output signal from the output terminal SAL of the microcomputer PRS, a current flows into the auxiliary light source ALED through the transistor ATR so that the optical system ALNS starts emission of the auxiliary light. That is, a storage operation to be described later with respect to the image signal is performed under emission of the auxiliary light in accordance with the image signal input only when flag AUXMOD=1, when the previous number of emissions of the auxiliary light does not reach the predetermined value, and when the in-focus state is not obtained in the previous focusing operation under emission of the auxiliary light.

When the auxiliary light is emitted in step (205), an auxiliary light emission counter AUXCNT is incremented by 1 in step (206).

Step (207): the focus detecting line sensor unit SNS starts storage of a light image. When the microcomputer PRS sends a "storage start instruction" to the sensor driving circuit SDR, the sensor driving circuit SDR sets "0" in the clear signal CLR to the photoelectric conversion element section of the sensor unit SNS to cause the sensor unit SNS to start charge storage.

Step (208): an initial value 0 is set in the storage time counter INTCNT.

Step (209): a 1-ms timer counter of the storage time timer is reset and is caused to start counting from a reset state. This counter uses a timer function of the microcomputer PRS.

Step (210): the microcomputer PRS determines whether the sensor unit SNS finishes storage, i.e., whether "1" is set in the signal INTEND from the sensor driving circuit SDR. The sensor driving circuit SDR sets "0" in the signal INTEND at the same time the line sensor unit SNS starts storage and monitors the output signal AGC from the storage controlling sensor of the sensor unit SNS. When the signal AGC reaches a predetermined level, the sensor driving circuit SDR sets "1" in the signal INTEND, and at the same time, sets the charge transfer signal SH at "H" for a predetermined time interval, thereby transferring the charge in the photoelectric conversion element section in the sensor unit SNS to the CCD section therein.

If storage is finished, the flow advances to step (215). Otherwise, the flow advances to step (211).

Step (211): the microcomputer PRS determines whether a storage time of 1 ms of the 1-ms timer has elapsed. If N in step (211), the flow returns to step (210). Otherwise, the flow advances to step (212), and a storage time counter INTCNT is incremented by one.

Step (213): the contents of the counter INTCNT are compared with a predetermined number MAXINT. The predetermined number MAXINT is a longest storage time represented in units of ms. If the contents of the counter INTCNT do not correspond to the longest storage time MAXINT, the flow returns to step (209), and storage end time is waited for. If the contents of the counter INTCNT coincide with the longest storage time MAXINT, storage is compulsorily finished in step (214).

In this case, storage is finished when the microcomputer PRS sends a "storage end instruction" to the sensor driving circuit SDR. When the "storage end instruction" is supplied from the microcomputer PRS, the sensor driving circuit SDR sets the charge transfer signal SH at "H" for a predetermined time interval so as to transfer the charge in the photoelectric conversion element section to the CCD section.

Step (215): the microcomputer PRS determines in accordance with the flag AUXMCD whether the auxiliary light mode is selected. If Y in step (215), the auxiliary light is turned off in step (216). The microcomputer PRS sets "0" in the signal from the output terminal SAL to deenergize the auxiliary light source ALED. Note that if step (216) is executed when the auxiliary mode is not selected, no adverse influence is caused. Therefore, steps (215) and (216) may be omitted.

Step (217): the storage time counter INTCNT is compared with a predetermined constant AUXINT. The constant AUXINT represents a low luminance storage time corresponding to the storage time. When INTCNT≧AUXINT (AUXINT<MAXINT), "1" is set in a low luminance flag LLFLG of step (219). When the INTCNT is below the AUXINT, "0" is set in the low luminance flag LLFLG.

In step (220), the signal AOS obtained by amplifying the image signal OS from the line sensor unit SNS by the sensor driving circuit SDR is A/D-converted and stored at a predetermined address of the RAM in the microcomputer PRS. Then, in step (221), the flow returns to a main routine, i.e., step (118).

The operations of the above image signal input subroutine can be summarized as follows.

When the above auxiliary light emission conditions are satisfied, the auxiliary light is emitted. The counter AUXCNT is incremented by one, and then the image signal is stored under emission of the auxiliary light. After image signal storage is finished in the predetermined time interval, or if storage is not finished in the predetermined time, after storage is compulsorily finished at the predetermined time, the auxiliary light is turned off. Then, the storage time of the image signal is determined. If the storage time exceeds the predetermined time, the low luminance is determined, and "1" is set in the flag LLFLG. Thereafter, the storage image signal is A/D-converted and stored in the RAM. If the auxiliary light emission conditions are not satisfied, this operation is executed without emitting the auxiliary light.

After the image signal input processing is performed in step (117) as described above, the flow advances to step (118). In step (118), the microcomputer PRS determines in accordance with the flag FAF whether the continuous photographing mode is selected.

If "1" is set in the flag FAF, i.e., the continuous photographing mode is selected, the flow advances to step (121), and if "0" is set therein, the flow advances to step (119). Step (119) indicates a flag concerning the auxiliary light. Since the flow advances to step (121) when "1" is set in the flag FAF, no processing concerning the auxiliary light is performed in the continuous photographing mode.

Step (119): the microcomputer PRS determines in accordance with the flag AUXMOD whether the auxiliary light mode is selected.

If the auxiliary light mode is selected in previous AF control, "1" is set in the flag AUXMOD, and the flow advances to step (128). If "0" is set in the flag AUXMOD, the flow advances to step (120), and the microcomputer PRS determines in accordance with a flag LLFLG whether luminance is low. The flag LLFLG is a flag set in the subroutine "image signal input" described above. If "1" is set in the flag LLFLG, i.e., the luminance is low, the flow advances to step 128. If the luminance is not low, the flow advances to step (121).

"1" is set in the flag AUXMOD in step (129) to be described later, and the auxiliary light is emitted under an absolute condition of flag AUXMOD=1 as described above. Flag AUXMOD=1 is obtained in steps (101) to (120) only when the selected mode is the one-shot or servo mode and AUXMOD=1 is determined in step (119) or flag LLFLG=1 is determined in step (120). The flow can advance to step (129) and hence the auxiliary light can be emitted only when the above conditions are satisfied.

Since "1" is set in the flag AUXMOD in only step (129), the determination result is always AUXMOD=0 in step (119) when step (129) is not executed in a previous operation. Therefore, if the auxiliary light is not emitted at all in the previous operation, only when "1" is set in the flag LLFLG as a result of the image signal input processing in step (117), i.e., only when the storage time of the image signal without emission of the auxiliary light is longer than the predetermined time and the low luminance is determined, the flow advances to step (129) through step (128), and emission of the auxiliary light is allowed.

Assume that as described above, "1" is set in the flag LLFLG in accordance with the image signal input without emission of the auxiliary light and the flow advances to step (128).

In step (128), the microcomputer PRS determines whether an auxiliary light unit is attached to the camera. In this case, this determination is performed by detecting a switching state of a switch (not shown) which is turned on when the auxiliary light unit is attached to the camera.

If the auxiliary light unit is not attached to the camera, the flow advances to step (121), and the auxiliary light is not emitted even if the low luminance is determined.

If the auxiliary light unit is attached to the camera, "1" is set in the flag AUXMOD in step (129), and the auxiliary light mode is set.

Step (130): the microcomputer PRS determines whether "0" is set in a counter AUXCNT. The counter AUXCNT is a variable which is counted in step (206) in the "image signal input" subroutine described above and is incremented by one when the image signal is stored in the photoelectric conversion element under emission of the auxiliary light. Note that the counter AUXCNT is cleared in step (005) of the flow chart shown in FIG. 2 when the switch SW1 is turned off and is cleared in step (103) of the flow chart shown in FIG. 3 in AF control of the continuous photographing mode.

Therefore, counter AUXCNT="0" represents that the auxiliary mode is selected for the first time in the sequence. In this case, i.e., when the auxiliary light mode is selected for the first time, the flow advances to step (131), and AF control by this image signal input is finished.

That is, the image signal input in step (117) is discarded, and a new image signal is input in the next AF control cycle under emission of the auxiliary light. Therefore, the image signal input in step (117) can be used to determine only the luminance.

Assume that the flow advances to step (130) while the auxiliary light is not previously emitted. In this case, the AF control subroutine is returned in step (131), the AE control subroutine is executed in step (003), and then the flow advances to the AF control subroutine again. Therefore, when the auxiliary light is not previously emitted and the low luminance is determined in step (117) of the AF control subroutine, the AF control subroutine is executed without focus detecting and focusing based on a detection result. Thus, the flow advances to the AF control subroutine after the low luminance is determined and then advances to step (117) through steps (101) to (114), and the image signal input subroutine is executed. In this case, since "1" is set in the flag AUXMOD in step (129) of the previous AF control subroutine and "0"s are set in the flags AUXNOEM and AUXJF because no auxiliary light is previously emitted, the image signal is stored under emission of the auxiliary light. After the image signal is stored, the flow advances to step (130) again through steps (118), (119), (128), and (129). Since the counter AUXCNT is incremented by one when the auxiliary light is emitted as described above, steps (130) and (132) are sequentially executed.

In step (132), the counter AUXCNT is compared with a predetermined constant AUXNUM. This constant AUXNUM is an emission limit count of the auxiliary light. If the count of the counter AUXCNT is below the emission limit count AUXNUM, the flow advances to step (122), and a subroutine of "focus detecting" is executed. If AUXCNT≧AUXNUM, the flow advances to step (133). In this case, since the auxiliary light is emitted for the first time, "1" is set in the counter AUXCNT, and AUXCNT<AUXNUM. Therefore, the flow advances to step (122). Steps (122) to (126) are steps for focus determination/defocus detection based on the image signal processed in step (117) and lens driving based on determination/detection results. In this case, the lens is driven by only a defocus amount detected under emission of the auxiliary light, and the AF control subroutine is returned. Then, the AE control subroutine is executed, and the flow advances to the AF control subroutine again. When the lens is driven in steps (122) to (126) and then the flow advances to the AF control subroutine, the flag PRMV is detected in step (105) since "1" is set in this flag in the previous AF control subroutine. The flow does not advances to step (109) and subsequent steps until lens driving of the previous AF control subroutine is stopped. After lens driving is stopped in the previous AF control subroutine, the operations in step (109) and the subsequent steps are processed. Note that once "1" is set in the flag AUXMOD, "0" is not set therein until an in-focus state is determined. Therefore, in the AF control subroutine executed until the in-focus state is determined, steps (117), (118), (119), (128), (129), (130), (132), and (122) to (126) are repeatedly performed. When the lens is focused during focusing performed under emission of the auxiliary light and this in-focus state is determined as described above, "1"s are set in the flags AUXJF and JF in a focus detecting subroutine of step (122) to be described later. Therefore, since the flow advances to step (124) and then to step (127) after the in-focus state is obtained, the AF control subroutine is returned without lens driving. When the next AF control subroutine is executed after the in-focus determination, AUXJF=1 is detected in step (204) of the image signal input subroutine. Therefore, the image signal input processing is performed without emission of the auxiliary light, and the flow advances to the focus detecting subroutine of step (122) through steps (128), (129), (130), and (132). In the focus detecting subroutine, when "1" is set in the flag AUXJF as will be described later, and when "0" is set in the flag LLFLG under a luminance state detected in the image signal input subroutine performed immediately before, i.e., when the luminance is sufficient, "0"s are set in the flags AUXJF, AUXNOEN, and AUXMOD, and at the same time, "0" is set in the counter AUXCNT. Then, in-focus determination or defocus detection is performed in accordance with the image signal obtained in the above image input subroutine, and lens driving or in-focus display is performed in accordance with a determination or detection result. That is, after the in-focus state is obtained under emission of the auxiliary light, normal image signal processing is performed without emission of the auxiliary light. When the luminance recovers a sufficient level after the in-focus state is obtained under emission of the auxiliary light, a normal focusing operation is performed without emission of the auxiliary light. When the luminance remains low after the in-focus state is obtained, the subroutine is returned without setting "0"s in the flags or the counter. Therefore, in this case, the lens is held at a position where the in-focus state is obtained under emission of the auxiliary light until the luminance recovers the sufficient level, and then the normal focusing operation without emission of the auxiliary light is performed.

As described above, once the in-focus state is obtained under emission of the auxiliary light, the AF control subroutine without emission of the auxiliary light is executed thereafter. In this case, if the luminance remains low after the in-focus state is obtained, the lens is held at the in-focus position without performing the focusing processing under emission of the auxiliary light until the luminance recovers the sufficient level, and then the lens is moved to the in-focus position in the AF control subroutine without emission of the auxiliary light. Thereafter, if the luminance is reduced, focusing is performed again under emission of the auxiliary light in the above manner. Therefore, focusing under emission of the auxiliary light is not performed continuously even if the luminance is low. Once the in-focus state is obtained, the luminance recovers the sufficient level, and focusing is not performed thereafter unless the luminance is reduced again. A case in which the auxiliary light emission count reaches the emission limit count AUXNUM before the in-focus state is obtained under emission of the auxiliary light will be described below.

In this case, the microcomputer PRS determines in step (133) in accordance with the flag AUXNOEM whether the predetermined emission count of the auxiliary light is detected. If the microcomputer PRS determines in accordance with the flag AUXNOEM that the auxiliary light is already emitted by the number of times corresponding to the predetermined constant AUX-NUM, emission of the auxiliary light is finished, and the auxiliary light is no longer emitted. That is, even if "1" is set in the flag AUXMOD in the subroutine of "image signal input", the auxiliary light is no longer emitted during image signal storage when "1" is set in the flag AUXNOEM and the predetermined auxiliary light emission count is detected.

When the emission count is determined to be detected in accordance with the flag AUXNOEM in step (133), the flow advances to step (134).

Since "1" is not set in the flag AUXNOEM in step (133) performed immediately after AUXNUM-≦AUXCNT is obtained under emission of the auxiliary light, "1" is set therein for the first time in step (135). Thereafter, steps (122) to (127) are performed, the AF control subroutine is returned, and the AF control subroutine is executed again. Since the flag AUXNOEM of "1" is detected in an image input subroutine in this AF control subroutine, image signal input processing is performed without emission of the auxiliary light. Thereafter, the flow advances to steps (128) to (133) and then to step (134).

In step (134), the microcomputer PRS determines in accordance with the flag LLFLG whether the luminance is low.

The flag LLFLG is a low luminance flag set in the "image signal input" subroutine as described above. In this case, the emission count is determined to be detected in accordance with the flag AUXNOEM and the luminance is determined in accordance with the flag LLFLG, i.e., the luminance is determined under a condition that "the auxiliary light is already emitted by the predetermined number of times in the auxiliary light mode and is no longer emitted". If the flag LLFLG does not indicate the low luminance, the flow advances to step (121), "0" is set in the flag AUXMOD to cancel the auxiliary light mode, and then the flow advances to step (122). Since the luminance is determined not to be low in accordance with the flag LLFLG, the auxiliary light mode is canceled and the normal mode is selected when the luminance is increased from this state. AF control in the normal mode is started again.

The flow advances to stp (121) under the conditions that "1" is set in the flag FAF in step (118) and continuous photographing (without emission of the auxiliary light) is determined and under the conditions that the flag AUXMOD does not indicate the auxiliary mode in step (119), "0" is set in the flag LLFLG, and the luminance is determined not to be low in next step (120). That is, when AF control is not the auxiliary light mode and luminance of an object to be photographed is not low, the flow advances to step (121).

If "1" is set in the flag LLFLG and the low luminance is determined in step (134), the flow directly advances to "focus detecting" in step (122).

In the above flow, the microcomputer PRS determines in accordance with the flag LLFLG whether the luminance is low only when the flag AUXNOEM indicates in step (133) that the emission count of the auxiliary light is detected. This is because luminance of an object to be photographed is increased by an influence of the auxiliary light under emission of the auxiliary light and hence true luminance cannot be determined. Therefore, when "0" is set in the flag AUXNOEM, i.e., the emission count of the auxiliary light is smaller than the predetermined number, determination of the low luminance is not performed.

Note that since steps (122) to (127) are executed when "1" is set in the flag LLFLG in step (134), the focusing operation without emission of the auxiliary light is repeatedly performed. If an in-focus state is determined at the low luminance, processing similar to that performed when the in-focus state is determined under emission of the auxiliary light is performed thereafter.

Figure 4B:
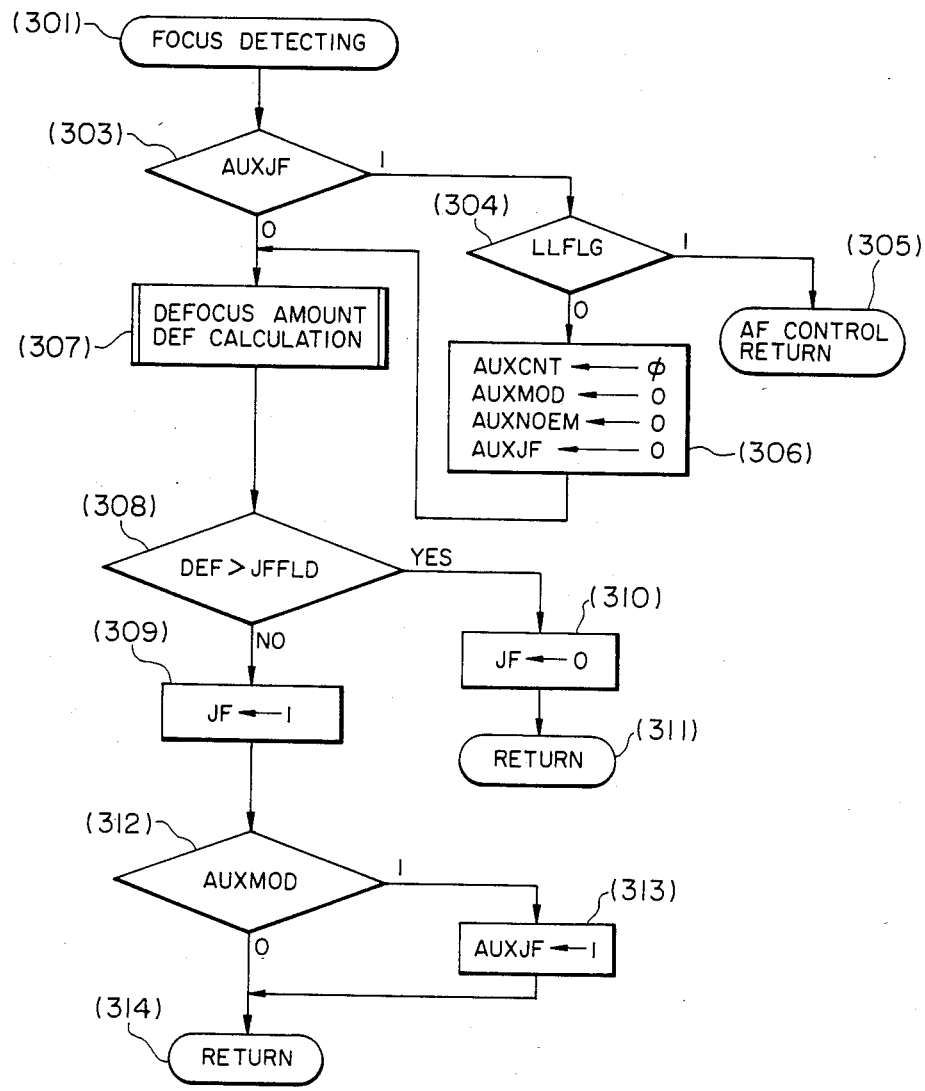

The focus detecting subroutine in step (122) will be described below with reference to FIG. 4(b).

Step (303): the microcomputer PRS determines in accordance with the flag AUXJF whether the in-focus state is obtained under emission of the auxiliary light in the previous operation. If Y in step (303), the flow advances to step (304).

Step (304): a state of the flag LLFLG is detected to determine whether luminance is low without emission of the auxiliary light. If "1" is set in the flag LLFLG, i.e., the low luminance is determined, AF control is finished in next step (305). If "0" is set in the flag LLFLG, i.e., the luminance is not low, the flow advances t step (306) because the luminance of an object to be photographed is increased. In step (306), the auxiliary light mode, emission count end, and in-focus flags AUXMOD, AUXNOEM, and AUXJF are cleared to "0", and then the auxiliary light counter flag AUXCNT is cleared to "0".

The operations of steps (303) to (306) will be described in more detail below. Since "1" is set in the flag AUXJF, i.e., the in-focus state is previously obtained under emission of the auxiliary light, a current image signal is a signal obtained when no auxiliary light is emitted. That is, when "1" is set in the flag AUXJF and the in-focus state is determined to be obtained under emission of the auxiliary light in step (204) of the "image signal input" subroutine, the auxiliary light is not turned on. Therefore, in step (304), the flag LLFLG is detected to determine the luminance without emission of the auxiliary light. If "1" is set in the flag LLFLG and the low luminance is determined, this represents that although the in-focus state is obtained under emission of the auxiliary light, the luminance thereafter remains low. Step (305) is a step for maintaining the in-focus state without performing AF cotrol when the luminance is low after the in-focus state is obtained under emission of the auxiliary light. An operation at that time is the same as that of the one-shot mode of AF control.

If "0" is set in the flag LLFLG and the luminance is determined not to be low, this represents that the luminance obtained without emission of the auxiliary light after the in-focus state is obtained under emission of the auxiliary light is not low. Therefore, the flags and the counter concerning the auxiliary light are cleared in step (306) to start AF control again.

As described above, in the auxiliary light mode, the AF control mode is set by the one-shot mode regardless that the AF control mode is previously operated by the one-shot mode or the servo mode. In this case, if the luminance of an object to be photographed is low, the one-shot mode is continuously performed. However, if the luminance of an object to be photographed varies in accordance with environmental conditions and is no longer low, AF control of the servo mode is started if the servo mode of the AF control mode is selected, and the flow advances to step (307).

Step (307): the defocus amount DEF of the photographing lens is calculated in accordance with an image signal from the "image signal input" subroutine.

In this step, on the basis of the digital value corresponding to image patterns on the sensors CCD1 and CCD2 obtained by the image signal input subroutine, an offset amount and an offset direction from the in-focus state are calculated as the defocus amount DEF. Since a calculation method of the defocus amount is not essentially associated with the present invention, a detailed description thereof will be omitted. In this case, a degree of coincidence between the image patterns on the sensors CCD1 and CCD2 is determined in accordance with the in-focus state. Therefore, comparison processing is performed with respect to digital values of the sensors which correspond to the patterns to obtain the degree of coincidence of the data, thereby obtaining the offset amount and direction from the in-focus state, i.e., the defocus amount DEF.

Step (308): the defocus amount DEF is compared with a constant value JFFLD.

If DEF>JFFLD, the flow advances to step (310). In step (310), "0" is set in the flag JF to finish the focus detecting subroutine, and then the flow advances to display in step (123) in FIG. 3.

If JFFLD>DEF, "1" is set in the in-focus flag JF of step (309), and then the flow advances to step (312). In this case, the constant value JFFLD indicates a predetermined in-focus width.

Step (312): the microcomputer PRS determines in accordance with the flag AUXMOD whether the auxiliary light mode is selected.

If the flag AUXMOD indicates the auxiliary light mode, "1" is set in the flag AUXJF in step (313) since the in-focus state is obtained under emission of the auxiliary light, the focus detecting subroutine is finished, and then the flow advances to "display" of step (123) in FIG. 3.

In the above focus detecting subroutine, after the in-focus state is determined to be obtained under emission of the auxiliary light, lens driving based on the image signal is inhibited until the luminance becomes sufficient. Then, after the luminance becomes sufficient, the detection defocus is obtained to determine whether the in-focus state is obtained. If the in-focus state is obtained, "1" is set in the flag FJ. In this case, if the auxiliary light mode is selected, "1" is also set in the flag AUXJF. With this arrangement, the respective operations in the auxiliary light mode are executed on the basis of a result of the focus detecting subroutine.

Next to the focus detecting subroutine, the "display" subroutine of step (123) is executed. However, since this subroutine displays the in-focus state of AF control described above by displaying only whether or not the in-focus state is obtained using a display member, and a detailed description thereof will be omitted.

Step (124): the microcomputer PRS determines in accordance with the flag JF whether the in-focus state is obtained.

The flag JF is a flag stored in the "focus detecting" subroutine. If the in-focus state is determined in accordance with the flag JF, i.e., the in-focus state is obtained, AF control is finished in step (127). If the determination result is such that the in-focus state is not obtained, the flow advances to step (125), and a lens driving subroutine is performed.

In the lens driving subroutine, the microcomputer PRS sets the "1" signal CLCM to designate the buffer circuit LCM.

The microcomputer PRS transmits a lens driving amount as the signal SO to the circuit LCM and transmits the signal SO as the DCL signal to the control circuit LPRS. The circuit LPRS sets the signal LMF or LMR at "H" in accordance with the lens driving amount to rotate the motor LMTR in a predetermined direction, thereby moving the photographing lens LNS in an optical axis direction. This lens moving amount is monitored by the encoder ENC, and a signal SENC corresponding to the moving amount is output. The signal SENC is compared with the signal transmitted to the circuit LPRS and representing defocus and the like. When the both signals coincide with each other, the signals LMF and LMR are set at "L" to stop rotation of the motor LMTR, and lens driving is finished.

By the above operation, the lens is moved by an amount corresponding to the defocus amount, and the lens driving subroutine is finished. Then, in step (126), "1" is set in the lens driving flag PRMV, and in step (127), AF control is finished.

The lens driving subroutine in step (401) in FIG. 4(c) will be described in more detail below.

Step (402): a "coefficient S of a defocus amount to a driving amount" is input from the photographing lens. In this case, the defocus amount is the DEF described above, and the driving amount is a moving amount in the optical axis direction of a focusing lens.

When the photographing lens is a standard lens, coefficient S=1, and when the photographing lens is a zoom lens, the coefficient S varies in accordance with a zooming position.

Step (403): a "driving amount PTH per a tooth of an encoder" is input. When the focusing lens is moved, the encoder generates pulses in accordance with movement. In this case, the driving amount PTH corresponding to a tooth of the encoder represents a moving amount of the lens per tooth.

Step (404): in accordance with the detected defocus amount DEF, the coefficient S of the defocus amount to the driving amount, and the driving amount PTH per tooth of the encoder, the moving amount of the focusing lens is represented by the number of teeth of the encoder as follows:

FP=DEF×S/PTH

Step (405): an integer FP obtained in step (404) is sent as a lens driving amount to the photographing lens to instruct lens driving, and lens driving is finished in step (406).

Since each step is arranged as a described above, normal AF controll is performed unless the low luminance is determined. When the one-shot mode is selected and the in-focus state is obtained, the focusing operation is inhibited thereafter. When the servo mode is selected, the lens is moved to the in-focus position in accordance with movement of an object to be photographed. If the low luminance is determined in step (120), the auxiliary light processing of steps (128) to (135) is performed, and focusing is executed under emission of the auxiliary light until the in-focus state is obtained. Then, after the in-focus state is obtained, the auxiliary light mode is canceled. In this case, if the low luminance is determined, lens driving is inhibited until the luminance becomes sufficient. Therefore, when the luminance is low after the in-focus state is obtained under emission of the auxiliary light, focusing under emission of the auxiliary light is not executed again, i.e., the auxiliary light mode is not continuously set. For this reason, the auxiliary light source is not broken by a continuous operation or does not exceed an emission energy limit. In addition, since luminance is not determined in accordance with the image signal obtained under emission of the auxiliary light, luminance determination is not adversely affected by emission of the auxiliary light. If the luminance is determined to be sufficient after the in-focus state is obtained under emission of the auxiliary light, the normal focusing operation is executed. In this case, if the low luminance is determined again, the auxiliary light mode is selected again, and focusing is executed again under emission of the auxiliary light. If the emission count reaches the predetermined value during focusing under emission of the auxiliary light, the auxiliary light is turned off to protect the auxiliary light source.

In the continuous photographing mode, since the flow advances to step (118) and then to step (121) and the subsequent steps, the auxiliary light is not emitted at all. Therefore, when the flow advances to the auxiliary light mode, prevented is time-consuming image storage in which an image is stored once, luminance is determined in accordance with the stored image, the low luminance is determined, an image signal is stored again under emission of the auxiliary light, and then focusing is performed on the basis of a storage result. Therefore, an AF control time is reduced to realize an object of continuous photographing.

Note that in the above embodiment, an LED is used as the auxiliary light source. However, an electronic flashbulb or a light bulb may be used.

As has been described above, according to the present invention, various effects can be obtained in an automatic focusing operation performed under emission of an auxiliary light.

What is claimed is:

1. A camera incorporating an automatic focusing apparatus, comprising:
   (a) a focus detecting circuit for detecting a focusing state of a focusing optical system with respect to an object to be photographed and outputting a focusing signal corresponding to the focusing state;
   (b) a driving circuit for driving said focusing optical system on the basis of the focusing signal;
   (c) a control circuit having a first mode for continuously causing to perform detection of the focusing state by said focus detecting circuit and driving of said focusing optical system by said driving circuit to perform focusing control according to movement of the object to be photographed and a second mode for inhibiting driving of said focusing optical system by said driving circuit after a detection result by said focus detecting circuit indicates that an in-focus state is obtained;
   (d) mode selecting means for manually selecting the first or second mode; and
   (e) an auxiliary light control circuit for emitting auxiliary light on the object to be photographed when the focusing state is detected by said focus detecting circuit, and when auxiliary light emission control is to be performed by said auxiliary light control circuit, for compulsorily switching the mode to the second mode even if the first mode is selected by said mode selecting means.

2. A camera according to claim 1, wherein said auxiliary light control circuit inhibits emission of the auxiliary light after said focus detecting circuit detects the in-focus state.

3. A camera according to claim 2, wherein said automatic focusing apparatus has luminance detecting means for detecting luminance of the object to be photographed, and said control circuit switches the mode to the first mode when said luminance detecting means detects that the luminance exceeds a predetermined value after said focus detecting circuit detects the in-focus state under emission of the auxiliary light.

4. A camera according to claim 3, wherein said auxiliary light control circuit is operated when said luminance detecting means detects that the luminance is below the predetermined value.

5. A camera incorporating an automatic focusing apparatus which detects luminance of an object to be Photographed, and when the detected luminance is below a predetermined value, causes an auxiliary light source to emit auxiliary light, thereby performing a focus detecting operation under emission of the auxiliary light and a focusing operation of a focusing optical system based on a result of the focus detecting operation, comprising:
   (a) luminance detecting means for detecting the luminance of the object to be photographed;
   (b) focus detecting circuit for repeatedly detecting a focusing state of said focusing optical system with respect to the object to be photographed and outputting a focusing signal corresponding to the focusing state, said focusing detecting circuit including image signal accumulating means for accumulating image light of the object to be photographed for a predetermined time interval and a focusing state determination circuit for outputting a focusing signal representing an in-focus state, a defocus amount, and the like on the basis of an image signal accumulated by said image signal accumulating means, said luminance detecting means detects a luminance level on the basis of a level of the accumulated image signal;
   (c) a driving circuit for driving said focusing optical system on the basis of the focusing signal from said focus detecting circuit;
   (d) an auxiliary light control circuit for energizing said auxiliary light source when the luminance detected by said luminance detecting means is below a predetermined value during a focusing state detecting operation by said focus detecting circuit so that said focus detecting circuit performs the focusing state detecting operation under emission of the auxiliary light and for deenergizing said auxiliary light source when the luminance exceeds the predetermined value so that said focus detecting circuit performs the focusing state detecting operation without emission of the auxiliary light; and
   (e) an inhibiting circuit for inhibiting OFF control of said auxiliary light source by said auxiliary light control circuit under emission of the auxiliary light.

6. A camera according to claims 5 and, wherein said auxiliary light control circuit is inhibited to perform response with respect to a luminance detection result of said luminance detecting means after emission of the auxiliary light is controlled, and keeps the auxiliary light source in an ON state during the focus detecting operation.

7. A camera incorporating an automatic focusing apparatus which detects luminance of an object to be photographed, and when the detected luminance is below a predetermined value, causes an auxiliary light source to emit auxiliary light, thereby performing a focus detecting operation under emission of the auxiliary light and a focusing operation of a focusing optical system based on a result of the focus detecting operation, comprising:

(a) luminance detecting means for detecting the luminance of the object to be photographed;

(b) focus detecting circuit for repeatedly detecting a focusing state of said focusing optical system with respect to the object to be photographed and outputting a focusing signal corresponding to the focusing state, said focus detecting circuit including image signal accumulating means for accumulating image light of the object to be photographed for a predetermined time interval and a focusing state determination circuit for outputting a focusing signal representing an in-focus state, a defocus amount, and the like of the basis of an image signal luminance detecting means detects a luminance level on the basis of a level of the accumulating image signal;

(c) driving circuit for driving said focusing optical system on the basis of the focusing signal from said focus detecting circuit;

(d) a control circuit for determining whether the luminance detected by said luminance detecting means is below the predetermined value, for causing said auxiliary light source to emit the auxiliary light during the focus detecting operation when the luminance is below the predetermined value, and for deenergizing said auxiliary light source when the luminance exceeds the predetermined value to perform the focus detecting operation; and (e) inhibiting means for inhibiting determination for turning on or off said auxiliary light source by said control circuit on the basis of luminance information detected by said luminance detecting means under emission of the auxiliary light.

8. A camera incorporating an automatic focusing apparatus which has a first automatic focusing mode for performing lens driving on the basis of a focus detecting operation performed without turning on an auxiliary light source and of a detection result obtained by the focus detecting operation and a second automatic focusing mode for performing lens driving on the basis of a focus detecting operation performed while turning on said auxiliary light source and of a detection result obtained by the focus detecting operation, comprising:

(a) a focusing control circuit having the first and second modes;

(b) a camera control circuit having a first camera control mode for causing said focusing control circuit to perform focus detecting and lens driving operations when a release operation member is in a predetermined operation state and causing a releasing operation when the predetermined operation state of said release operation member is changed to another predetermined operation state and a second camera control mode for alternately and repeatedly causing the focus detecting and lens driving operations by said focusing control circuit and the releasing operation; and (c) a designating circuit for compulsorily designating the first automatic focusing mode as a mode of said focusing control circuit when said camera control circuit is in the second camera control mode.

9. A camera according to claim 9, wherein said camera comprises a mode setting circuit for setting the second automatic focusing mode when a luminance level is below a predetermined level on the basis of luminance information, and said designating circuit inhibits a second automatic focusing mode operation performed by said mode setting circuit when said camera control circuit is in the second camera control mode.

10. A camera incorporating an automatic focusing apparatus which has a first automatic focusing mode for performing lens driving on the basis of a focus detecting operation performed without turning on an auxiliary light source and of a detection result obtained by the focus detecting operation and a second automatic focusing mode for performing lens driving on the basis of a focus detecting operation performed while turning on said auxiliary light source and of a detection result obtained by the focus detecting operation, comprising:

(a) a focusing control circuit having the first and second modes;

(b) detecting means for detecting an emission count of the auxiliary light emitted in accordance with an focus detecting operation which is repeatedly performed in an automatic focusing operation in the second automatic focusing mode, and when the auxiliary light is emitted by a predetermined number of times, for generating an output; and (c) a control circuit for switching the mode of the focusing control circuit to the first mode in accordance with the output from said detecting means so that said focusing control circuit continuously performs the focus detecting and lens driving operations.

11. A camera according to claim 11, wherein said control circuit inhibits lens driving after an in-focus state is obtained in the focus detecting operation performed after the second mode is switched to the first mode.

* * * * *

UNITED STATES PATENT AND TRADEMARK OFFICE
CERTIFICATE OF CORRECTION

PATENT NO. : 4,801,962                                Page 1 of 2
DATED     : January 31, 1989
INVENTOR(S) : Akashi It is certified that error appears in the above-identified patent and that said Letters Patent is hereby corrected as shown below:

SHEET 1
    Figure 1, change "PHOTOMETRING" to --PHOTOMETERING--.

SHEET 1
    Figure 4C, change "TEETH" to --TOOTH--.

COLUMN 2
    Line 38, change "he" to --the--.

COLUMN 5
    Line 26, change "shown)" to --shown).--; and
    Line 31, change "detected" to --detected.--

COLUMN 6
    Line 43, change "subroutined" to --subroutine--;
    Line 60, change "display" to --display.--; and
    Line 66, delete "0".

COLUMN 12
    Line 2, change "advances" to --advance--;

COLUMN 13
    Line 56, change "stp (121)" to --step (121)--.

COLUMN 14
    Line 33, change "t" to --to--; and
    Line 55, change "AF cotrol" to --AF control--.

COLUMN 15
    Line 64, delete "and".

COLUMN 16
    Line 60, change "AF controll" to --AF control--.

UNITED STATES PATENT AND TRADEMARK OFFICE
CERTIFICATE OF CORRECTION

PATENT NO. : 4,801,962

DATED : January 31, 1989

INVENTOR(S) : Akashi

It is certified that error appears in the above-identified patent and that said Letters Patent is hereby corrected as shown below:

<u>COLUMN 17</u>
    Line 10, change "-the" to --the,--.
    Line 63, change "is-obtained;" to --is obtained;--.

<u>COLUMN 18</u>
    Line 24, change "Photographed" to --photographed--;
    Line 37, change "focusing detecting circuit" to --focus detecting circuit--; and
    Line 67, change "claims 5 and," to --claim 5 and--.

<u>COLUMN 19</u>
    Line 27, change "image signal" to --image signal accumulated by said image signal accumulating means, said--; and
    Line 31, change "driving circuit" to --a driving circuit--.

<u>COLUMN 20</u>
    Line 19, change "claim 9" to --claim 8--;
    Line 41, change "an" to --a--; and
    Line 53, change "claim 11," to --claim 10,--.

Signed and Sealed this

Sixth Day of March, 1990

Attest:

JEFFREY M. SAMUELS

*Attesting Officer*      *Acting Commissioner of Patents and Trademarks*